(12) United States Patent
Blume

(10) Patent No.: US 9,435,454 B2
(45) Date of Patent: Sep. 6, 2016

(54) FLUID END WITH CARBIDE VALVE SEAT AND ADHESIVE DAMPENING INTERFACE

(71) Applicant: George H Blume, Austin, TX (US)

(72) Inventor: George H Blume, Austin, TX (US)

( * ) Notice: Subject to any disclaimer, the term of this patent is extended or adjusted under 35 U.S.C. 154(b) by 317 days.

(21) Appl. No.: 14/014,594

(22) Filed: Aug. 30, 2013

(65) Prior Publication Data

US 2014/0070127 A1    Mar. 13, 2014

Related U.S. Application Data

(63) Continuation-in-part of application No. 12/390,517, filed on Feb. 23, 2009, now Pat. No. 8,147,227, and a continuation-in-part of application No. 13/385,960, filed on Mar. 16, 2012, now Pat. No. 8,915,722.

(60) Provisional application No. 61/695,372, filed on Aug. 31, 2012.

(51) Int. Cl.
| | |
|---|---|
| *F16K 25/00* | (2006.01) |
| *F04B 53/00* | (2006.01) |
| *F04B 53/10* | (2006.01) |
| *F04B 53/16* | (2006.01) |
| *F16K 1/42* | (2006.01) |
| *F16K 15/06* | (2006.01) |

(52) U.S. Cl.
CPC ........... *F16K 25/005* (2013.01); *F04B 53/007* (2013.01); *F04B 53/1032* (2013.01); *F04B 53/1087* (2013.01); *F04B 53/16* (2013.01); *F04B 53/164* (2013.01); *F16K 1/42* (2013.01); *F16K 15/063* (2013.01)

(58) Field of Classification Search
CPC ...... F16K 1/42; F16K 15/063; F16K 25/005; F04B 53/1087; F04B 53/1032; F04B 53/16; F04B 53/164; F04B 53/007
USPC ...................................... 251/359; 137/315.33
See application file for complete search history.

(56) References Cited

U.S. PATENT DOCUMENTS

| | | |
|---|---|---|
| 1,947,071 A | 2/1934 | Walton |
| 2,236,370 A | 3/1941 | Jackman |
| 2,316,480 A | 7/1951 | Redman |
| 2,918,078 A | 12/1959 | Cummings |
| 3,053,500 A | 9/1962 | Atkinson |
| 3,905,608 A | 9/1975 | Olsen et al. |
| 4,084,606 A | 4/1978 | Mittleman |
| 4,456,440 A | 6/1984 | Korner |
| 4,467,703 A | 8/1984 | Redwine et al. |
| 4,477,236 A | 10/1984 | Elliott |
| 4,508,133 A | 4/1985 | Hamid |
| 4,527,961 A | 7/1985 | Redwine et al. |
| 4,573,886 A | 3/1986 | Maasberg et al. |

(Continued)

OTHER PUBLICATIONS

ASM Handbook Copyright 2000; Table 6.*

*Primary Examiner* — Craig Schneider
*Assistant Examiner* — Kevin Barss
(74) *Attorney, Agent, or Firm* — Gary W. Hamilton

(57) ABSTRACT

A tungsten carbide seat for high-pressure oilfield well service pumps is disclosed. A bonding agent, in conjunction with an interference tapered fit between the valve seat and fluid end housing eliminates stresses created in prior art interference fits. Three interface embodiments are disclosed: a shallow taper combined with a shoulder, a steep taper without a shoulder, and a compound surface in which the seat has an external concave surface and the housing surface that mates with the seat has a convex surface.

15 Claims, 11 Drawing Sheets

(56) References Cited

U.S. PATENT DOCUMENTS

| | | | |
|---|---|---|---|
| 4,699,575 A * | 10/1987 | Geisel et al. | 418/104 |
| 4,766,927 A | 8/1988 | Conatser | |
| 4,768,933 A | 9/1988 | Stachowiak | |
| 4,771,801 A | 9/1988 | Crump et al. | |
| 4,773,833 A | 9/1988 | Wilkinson et al. | |
| 4,878,815 A | 11/1989 | Stachowiak | |
| 5,020,809 A | 6/1991 | Mullaney | |
| 5,139,042 A * | 8/1992 | Calhoun | 137/15.17 |
| 5,145,340 A | 9/1992 | Allard | |
| 5,170,989 A * | 12/1992 | Kemp | 251/174 |
| 5,226,445 A | 7/1993 | Surjaatmadja | |
| 5,586,530 A * | 12/1996 | Adachi et al. | 123/188.8 |
| 5,622,486 A | 4/1997 | McDuffie et al. | |
| 5,787,853 A * | 8/1998 | Adachi et al. | 123/193.5 |
| 5,839,468 A | 11/1998 | Allred | |
| 5,924,853 A | 7/1999 | Pacht | |
| 6,176,692 B1 | 1/2001 | Reinartz et al. | |
| 6,179,943 B1 * | 1/2001 | Welch et al. | 156/160 |
| 6,182,684 B1 * | 2/2001 | Frankenberg | 137/340 |
| 6,241,492 B1 | 6/2001 | Pacht | |
| 6,264,441 B1 | 7/2001 | Marioni | |
| 6,267,383 B1 | 7/2001 | Morvant | |
| 6,410,127 B1 * | 6/2002 | Kamae et al. | 428/297.4 |
| 6,517,049 B2 | 2/2003 | Coppock | |
| 6,623,259 B1 | 9/2003 | Blume | |
| 7,364,412 B2 | 4/2008 | Kugekev et al. | |
| 8,147,227 B1 | 4/2012 | Blume | |
| 8,915,722 B1 | 12/2014 | Blume | |
| 2002/0096217 A1 | 7/2002 | Wu et al. | |
| 2004/0238780 A1 * | 12/2004 | Gethmann et al. | 251/359 |
| 2008/0041439 A1 | 2/2008 | Achutharaman et al. | |
| 2011/0206546 A1 | 8/2011 | Vicars | |

* cited by examiner

FLUID END WITH CARBIDE VALVE SEAT AND ADHESIVE DAMPENING INTERFACE

RELATED APPLICATION DATA

This Patent Application claims priority to Provisional Patent Application No. 61/695,372, filed on Aug. 31, 2012, which, by this reference is incorporated for all purposes. This application also is a continuation-in-part of, and claims the priority benefit of, U.S. patent application Ser. No. 12/390,517 filed on Feb. 23, 2009 and Ser. No. 13/385,960 filed on Mar. 16, 2012, the entire contents of which are hereby incorporated herein by this reference thereto.

FIELD OF THE INVENTION

The invention relates generally to methods for installing and assembling tungsten carbide seats in fluid ends used in high pressure oilfield well service pumps.

BACKGROUND

The statements in this background section merely provide background information related to the present disclosure and may not constitute prior art.

Engineers typically design high-pressure oil field plunger pumps in two sections; the (proximal) power section and the (distal) fluid section. The power section usually comprises a crankshaft, reduction gears, bearings, connecting rods, crossheads, crosshead extension rods, etc. The power section is commonly referred to as the power end by the users and hereafter in this application. The fluid section is commonly referred to as the fluid end by the users and hereafter in this application. Commonly used fluid sections usually comprise a plunger pump housing having a suction valve in a suction bore, a discharge valve in a discharge bore, an access bore, and a plunger in a plunger bore, plus high-pressure seals, retainers, etc. FIG. 1 is a cross-sectional schematic view of a typical fluid end showing its connection to a power end by stay rods. FIG. 1 also illustrates a fluid chamber which is one internal section of the housing containing the valves, seats, plungers, plunger packing, retainers, covers, and miscellaneous seals previously described. A plurality of fluid chambers similar to that illustrated in FIG. 1 may be combined, as suggested in the Triplex fluid end housing schematically illustrated in FIGS. 2A-D.

Valve terminology varies according to the industry (e.g., pipeline or oil field service) in which the valve is used. In some applications, the term "valve" means just the valve body, which reversibly seals against the valve seat. In other applications, the term "valve" includes components in addition to the valve body, such as the valve seat and the housing that contains the valve body and valve seat. A valve as described herein comprises a valve body and a corresponding valve seat, the valve body typically incorporating an elastomeric seal within a peripheral seal retention groove.

Valves can be mounted in the fluid end of a high-pressure pump incorporating positive displacement pistons or plungers in multiple cylinders as illustrated in FIGS. 1 and 2. FIG. 3 illustrates a cross sectional view of one of the cylinders of FIGS. 1 and 2. Such valves typically experience high pressures and repetitive impact loading of the valve body and valve seat. These severe operating conditions have in the past often resulted in leakage and/or premature valve failure due to metal wear and fatigue. In overcoming such failure modes, special attention is focused on valve sealing surfaces (contact areas) where the valve body contacts the valve seat intermittently for reversibly blocking fluid flow through a valve.

Valve sealing surfaces are subject to exceptionally harsh conditions in exploring and drilling for oil and gas, as well as in their production. For example, producers often must resort to "enhanced recovery" methods to insure that an oil well is producing at a rate that is profitable. And one of the most common methods of enhancing recovery from an oil well is known as fracturing. During fracturing, cracks are created in the rock of an oil bearing formation by application of high hydraulic pressure. Immediately following fracturing, a slurry comprising sand and/or other particulate material is pumped into the cracks under high pressure so they will remain propped open after hydraulic pressure is released from the well. With the cracks thus held open, the flow of oil through the rock formation toward the well is usually increased.

The industry term for particulate material in the slurry used to prop open the cracks created by fracturing as the propend. And in cases of very high pressures within a rock formation, the propend may comprise extremely small aluminum oxide spheres instead of sand. Aluminum oxide spheres may be preferred because their spherical shape gives them higher compressive strength than angular sand grains. Such high compressive strength is needed to withstand pressures tending to close cracks that were opened by fracturing. Unfortunately, both sand and aluminum oxide slurries are very abrasive, typically causing rapid wear of many component parts in the positive displacement plunger pumps through which they flow. Accelerated wear is particularly noticeable in plunger seals and in the suction (i.e., intake) and discharge valves of these pumps.

A valve comprising a valve body and seal assembly and valve seat that is an example full open design valve and seat for a fracturing plunger pump is schematically illustrated in FIG. 4. FIG. 5 shows how propend particulates, such as sand and/or aluminum oxide spheres, may become trapped between sealing surface of valve body and sealing surface of valve seat as the suction valve closes during the pump's pressure stroke.

The valve of FIG. 4 is shown in the open position. FIG. 5 shows how accelerated wear begins shortly after the valve starts to close due to back pressure. For the valve, back pressure tends to close the valve when downstream pressure exceeds upstream pressure. For example, when the valve is used as a suction valve, back pressure is present on the valve during the pump plunger's pressure stroke (i.e., when internal pump pressure becomes higher than the pressure of the intake slurry stream). During each pressure stroke, when the intake slurry stream is thus blocked by a closed suction valve, internal pump pressure rises and slurry is discharged from the pump through a discharge valve. For a discharge valve, back pressure tending to close the valve arises whenever downstream pressure in the slurry stream (which remains relatively high) becomes greater than internal pump pressure (which is briefly reduced each time the pump plunger is withdrawn as more slurry is sucked into the pump through the open suction valve).

When back pressure begins to act on a valve, the propend slurry particles become trapped in the narrow space that still separates the sealing surfaces of the valve body and seat. This trapping occurs because the valve is not fully closed, but the valve body's elastomeric seal has already formed an initial seal against the valve seat. The narrow space shown in FIG. 5 between metallic sealing surfaces of the valve body and valve seat respectively is typically about 0.040 to about 0.080 inches wide; this width (being measured perpendicular to the sealing surfaces of the valve body and seat) is called the standoff distance. The size of the standoff distance is determined by the portion of the valve body's elastomeric seal that protrudes beyond the adjacent valve body sealing surfaces to initially contact, and form a seal against, the valve seat. As schematically illustrated in FIG. 5, establishment of this initial seal by an elastomeric member creates a circular recess or pocket that tends to trap propend particulate matter in the slurry flowing through the valve.

Formation of an initial seal as a valve is closing under back pressure immediately stops slurry flow through the valve. Swiftly rising back pressure tends to drive slurry backwards through the now-sealed valve, but since backflow is blocked by the initial valve sealing, pressure builds rapidly on the entire valve body. This pressure acts on the area of the valve body circumscribed by its elastomeric seal to create a large force component tending to completely close the valve. For example, a 5-inch valve exposed to a back pressure of 15,000 pounds per square inch will experience a valve closure force that may exceed 200,000 pounds.

The large valve closure force almost instantaneously drives the affected valve, whether suction or discharge, to the fully closed position where the metal sealing surface of the valve body contacts the corresponding metal sealing surface of the valve seat. As the valve body moves quickly through the standoff distance toward closure with the valve seat, the elastomeric seal insert is compressed, thus forming an even stronger seal around any slurry propend particles that may have been trapped between the seal insert and the valve seat.

Simultaneously, the large valve closure force acting through the standoff distance generates tremendous impact energy that is released against the slurry particles trapped between the metallic sealing surfaces of the valve body and the valve seat. As shown in FIG. 6, the slurry propend particulates that are trapped between approaching valve sealing surfaces are severely compressed and crushed.

In addition to the crushing action described above, slurry particles are also dragged between the valve sealing surfaces in a grinding motion. This grinding action occurs because valve bodies and seats are built with complementary tapers on the sealing surfaces to give the valve a self-alignment feature as the valve body closes against the seat. As the large valve closing force pushes the valve body into closer contact with the seat, the valve body tends to slide down the sealing surface taper by a very small amount. Any crushed slurry particles previously trapped between the sealing surfaces are then ground against these surfaces, resulting in extreme abrasive action.

To limit sealing surface erosion due to this abrasion, valve bodies and seats have in the past been heat-treated to harden and strengthen them. Typical heat treatment methods have included carburizing, as well as hardening by induction heating and flame hardening. All of these hardening processes depend on quenching (i.e., rapid cooling) of the valve components after they have been uniformly heated, preferably slightly above a critical temperature (called the upper transformation temperature).

When a steel object is uniformly heated to a temperature slightly above its upper transformation temperature, all of the steel in the object assumes a face-centered cubic crystal lattice structure known as austenite. When the object is quenched below this temperature, other crystal lattice structures are possible. If quenched uniformly, the other crystal lattice structures tend to appear uniformly throughout the object. But if certain portions of the object are cooled at rates different from those applicable to other portions of the object, then the crystal lattice structure of the cooled object may be non-uniform.

Further, if steel is heated too far above its upper transformation temperature before quenching, its grain structure may be unnecessarily coarsened, meaning that the steel will then be less tough and more brittle after quenching than it would have been if its maximum temperature had been closer to its upper transformation temperature. It is therefore important that heat treatments for a particular steel be applied uniformly when uniform results are desired, and it is further important that maximum temperatures not be so high as to adversely affect the steel's grain structure.

Quenching is preformed primarily to influence the formation of a desirable crystal lattice and/or grain structure in a cooled metal, a grain being a portion of the metal having external boundaries and a regular internal lattice. Quenching may be accomplished, for example, simply by immersion of a heated metal object in water or oil. Certain tool steels may even be quenched by gas (e.g., air or inert gas), but the carbon steels traditionally used for valve seats can not be gas-quenched if they are to develop the hardness, strength and toughness necessary for use in high-pressure valves.

Heat treating of metals has been extensively studied, and many desirable properties may be obtained in metals through elaborate quench and temper protocols that have been experimentally developed. But preferred heat treatments are highly specific to particular alloys, so there may be no single optimal heat treatment for a component such as a valve seat comprising, for example, a high-alloy sealing surface inlay on a carbon steel substrate. Indeed, even the most careful use of heat treatments to favor development of hard sealing surfaces on strong, tough substrates has not proven effective for extending the service life of valves traditionally used for high-pressure abrasive slurries. Thus, engineers have long sought better methods of hardening valve sealing surfaces at acceptable cost.

For example, incorporation of metallic carbides in sealing surfaces has been investigated because some metallic carbides are extremely hard and wear-resistant. But such carbides do not bond well with the low-carbon steels commonly used in high pressure valve seats. Hence, when metallic carbide inlays are applied to such valve seat substrates, they must actually be held in place by some type of cement which itself forms an adequate bond with the valve seat substrate steel.

To facilitate mixing metallic carbides with cement(s), the carbides are made commercially available in powder form. Such powders (e.g., carbides of vanadium, molybdenum, tungsten or chromium) are formed by casting the pure carbides and then crushing them into the desired particle size. A cement (comprising, e.g., cobalt, chromium, and/or nickel) is then added to the crushed carbide powders, but there is little or no opportunity for the cement to alloy with the carbides.

Metallic carbide particles thus bound as an inlay on a steel substrate are called cemented carbides, and they comprise a matrix consisting of a dispersion of very hard carbide particles in the (relatively softer) cement. The resulting cemented carbide inlays are thus not homogeneous, so they do not possess the uniform hardness that would ideally be desired for good abrasion resistance and toughness in valve sealing surfaces. One problem associated with this inhomogeneity becomes evident because the crushing and grinding of slurry particles between valve sealing surfaces during valve closure produces a variety of slurry particle sizes, some so fine that they are smaller than the spacing between the carbide particles in the cemented carbide inlay. These fine slurry particles are very abrasive, and if they can fit between the carbide particles, they can rapidly wear away the relatively soft cement holding the carbide particles in place. Thus loosened (but not actually worn down), the carbide particles can simply be carried away by the slurry stream, leaving the remainder of the inlay cement exposed to further damage by the abrasive slurry. Problems associated with inhomogeneity of cemented carbide inlays may be reduced by choosing relatively high carbide content (e.g., about 85% to about 95%) and sub-micron carbide particle size. Such results have been confirmed by testing according to ASTM B 611 (Test Method for Abrasive Wear Resistance of Cemented Carbides).

Notwithstanding the above problems, cemented carbides, particularly those applied by gas-fueled or electrically-heated welding equipment, have been widely used to reduce abrasion damage in various industrial applications. But weld-applied carbide inlays have not been found acceptable in high pressure valves. This is due in part to a need for relatively high cement content in weld-applied inlays, leading to relatively high porosity inlays having low abrasion resistance and a predisposition to multiple internal stress risers. Low abrasion resistance results from wide spacing of wear-resistant carbide particles, separated by relatively softer cement. And the internal stress risers exacerbate cracking of brittle cemented carbide inlays under the repetitive high-impact loading common in high pressure valves. The result has typically been an increased likelihood of premature (often catastrophic) valve failures. Thus, a long-felt need remains for better technology in valve seat materials that improve valve seat endurance and avoiding an excessive likelihood of cracking.

While such cracks are tolerated in certain applications where the cracks do not significantly affect the performance of the part, the same cannot be said of high pressure valves. On the contrary, cyclic fatigue associated with the repeated large impact loads experienced by these valves magnifies the deleterious effects of cracks and residual stresses that may result from differentials in coefficients of thermal expansion. Premature catastrophic failures of valve bodies and/or seats are a frequent result.

Advances in high pressure plunger pump housings that provide both improved internal access and superior stress reduction are expressed in U.S. Pat. Nos. 6,623,259, 6,544,012 and 6,382,940, which are incorporated herein by reference. As illustrated in FIG. 3, suction and discharge seat bores that accommodate valve seats are typically slightly conically-shaped to facilitate the secure and substantial leak-proof fitment of each valve seat within a bore of pump housing (e.g., by press-fitting a valve seat that has an interference fit with the pump housing).

The press-fitting of valve seats is effective in that the seat is seized in place by the interference fit and an effective high pressure seal is formed between the seat taper and the fluid end taper. However the fluid end housing in the area of the taper is put in tensile stress by interference fit and the seat is put in compressive stress by the interference fit. All metallic structures are substantially incompressible. Thus compressive stress in one area of the seat is relieved as tensile stress in another area of the seat. These applied stresses from the interference fit substantially limits the option of constructing the valve seat from a homogeneously wear resistant material such as tungsten carbide or ceramics.

Standard high-pressure seat designs commonly used in the industry feature seats with a shoulder and a seat taper of 0.75 inches per foot on the diameter. These tapers mate with a similar taper in the receiving fluid chamber of the fluid end. This very "fast" taper is insufficient to retain the seat in a locked position and when the seat is subjected to very high valve loads. Due to such a fast taper, a shoulder is necessary on the seat to prevent the seat from sliding down the taper when the seat is subjected to very high valve loads. Thus, the seat shoulder is exposed to very high downward or axial loads, which results in the very high stresses in the fillet shoulder, as further discussed herein. While the interference fit functions as an effective seal and holding mechanism between the seat and the fluid end housing, the interface is very rigid. Thus all the valve impact loads are transmitted directly to the fluid end housing and the fillet shoulder, increasing stress in the fillet shoulder.

SUMMARY OF THE INVENTION

Currently available valves and seats for plunger-type pumps used in hydraulic fracturing of sub-strata have been standardized by manufacturers and fracturing pump users to promote commonality, increase availability, and reduce costs of these highly expendable components. However, an integrated design fluid end is needed to address the problems experienced by valves and seats of the current art and described in detail in the background section of this application. In the integrated design approach, valves and seats and the fluid end and all associated components are designed concurrently. Valves and seats are designed to improve the performance of fluid end blocks as described in the U.S. patent application Ser. No. 13/385,960 filed Mar. 16, 2012. The same application also describes fluid ends and components designed to improve the performance of valves and seats, i.e. an integrated design.

To achieve increased valve seat performance and endurance, seats must be manufactured of extreme wear resistant materials such as tungsten carbide or ceramics. As explained in the background tungsten carbide or ceramic inlays are not practical for the reasons discussed. This invention utilizes a seat of homogenous material of tungsten carbide or ceramics that are inherently very brittle materials. As described in U.S. patent application Ser. No. 13/385,960 filed Mar. 16, 2012, this invention eliminates the seat shoulder of the prior art. More specifically, this invention utilizes bonding agent to hold and seal the valve seat in place in the fluid end to overcome the stresses from prior art interference fit of the seat taper into the fluid end taper.

Several embodiments for the configuration of the outer surface of the valve seat are provided by this disclosure. The outside diameter of the valve seat must be fully captured by the corresponding fluid end taper to contain the seat and prevent fracture of the brittle tungsten carbide seat material. In the learned art it is well known that the maximum seat taper wherein the seat will seize by inference fit is 2.5 inches taper per foot on the diameter. At greater taper angles, the tapered mating surface of the valve seat will release from the corresponding tapered mating surface of the fluid end housing. It is also known in the art that at angles less than 2.5 inches per foot on the diameter, the valve seat can be forced through the taper by extreme force from very high pressure.

In a first embodiment of the present disclosure, the valve seat taper is very shallow—between zero taper and 2.5 inches per foot on the diameter. To prevent the valve seat from breaking the seal provided by the bonding agent and being forced through the taper, an internal shoulder is added to the bottom of the taper in the fluid end housing. A pure cylindrical interface is possible with a bonding agent; however, a minimum taper is preferred to insure that the bonding agent spreads evenly between the male and female tapers of the seat and fluid chambers, respectively.

In a second embodiment, the valve seat taper exceeds 2.5 inches per foot on the diameter. In this embodiment an internal shoulder is not needed in the fluid end housing because the steep taper angle prevents the seat from being forced through the fluid end taper. The steep angle will not seize the valve seat however the bonding agent serves to seize and lock the valve seat in place.

In a third embodiment, the valve seat-to-fluid end interface is a complex curved surface with almost no taper. The valve seat mating surface is concave and the fluid end mating surface is convex. As the interface moves to the bottom of the seat, the taper angle increases at a linear rate forming an arc when viewed as a cross section cut though the center of the seat. The convex and concave surfaces fluid end and seat respectfully, must match. The bottom portion of the fluid end convex surface essentially becomes a shoulder for the seat's concave surface to bear against.

If the valve seat taper substantially matches the fluid end taper, the bonding agent will spread evenly throughout the interface with slight pressure applied to the seat during the curing phase of the bonding agent. Similarly if the valve seat's concave surface matches the fluid end's convex surface, the bonding agent will spread evenly throughout the interface with slight pressure applied to the seat during the curing phase of the bonding agent. A worn seat can be removed easily by applying heat to break the seal provided by the bonding agent.

Epoxy bonding agents can be single-part or multi-part adhesives. One-part adhesives harden via a chemical reaction with an external energy source, such as radiation, heat, and moisture. Multi-part adhesives harden by mixing two or more components which chemically react. This reaction causes polymers to cross-link into acrylics, urethanes, and epoxies. The individual components of a multi-component adhesive are not adhesive by nature. The individual components react with each other after being mixed and show full adhesion only upon curing. The multi-component resins can be either solvent-based or solvent-less. The solvents present in the adhesives are a medium for the polyester or the polyurethane resin. The solvent is dried during the curing process.

Some epoxies such as structural acrylics have excellent shock or impact resistance. The addition of an impact resistant interface between the seat taper and the fluid end housing taper will dampen a significant amount of the valve impact stress before this stress is transferred to the fluid end housing, thus reducing stress on the housing. An effective dampening member must have a lower modulus of elasticity than either of the two members that it separates. A carbide seat has a modulus of elasticity of approximately 75,000,000 psi (pounds per square inch;) the steel housing has a modulus of elasticity of approximately 30,000,000 psi. Epoxies with a modulus of elasticity of approximately 500,000 psi function as a very effective dampening member between the seat and the housing. The dampening member of this invention also must also function as an adhesive; epoxies have high shear and compressive strengths at the bond interface. In this invention the epoxy interface is loaded in compression and shear.

The strength of any material is directly proportional to its modulus of elasticity. While the low modulus of elasticity functions as an effective dampener, the internal strength of the epoxy is limited. To prevent the epoxy from failing internally in shear, the interface must be kept thin with a gap thickness between the seat and housing no greater than 0.010 inches per side. During curing slight pressure applied on the male member (seat) against the female member will ensure that excess epoxy is squeezed out between the mating tapers to keep the gap thickness below 0.010 inches. The mating tapers also ensure that the gap thickness is uniform circumferentially around the taper, varying by no more than 0.003 inches around the taper circumference.

DETAILED DESCRIPTION

Embodiments of the disclosure provide systems and methods for assembling and installing tungsten carbide seats in high pressure oilfield well service pumps. Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure.

Figure 1:
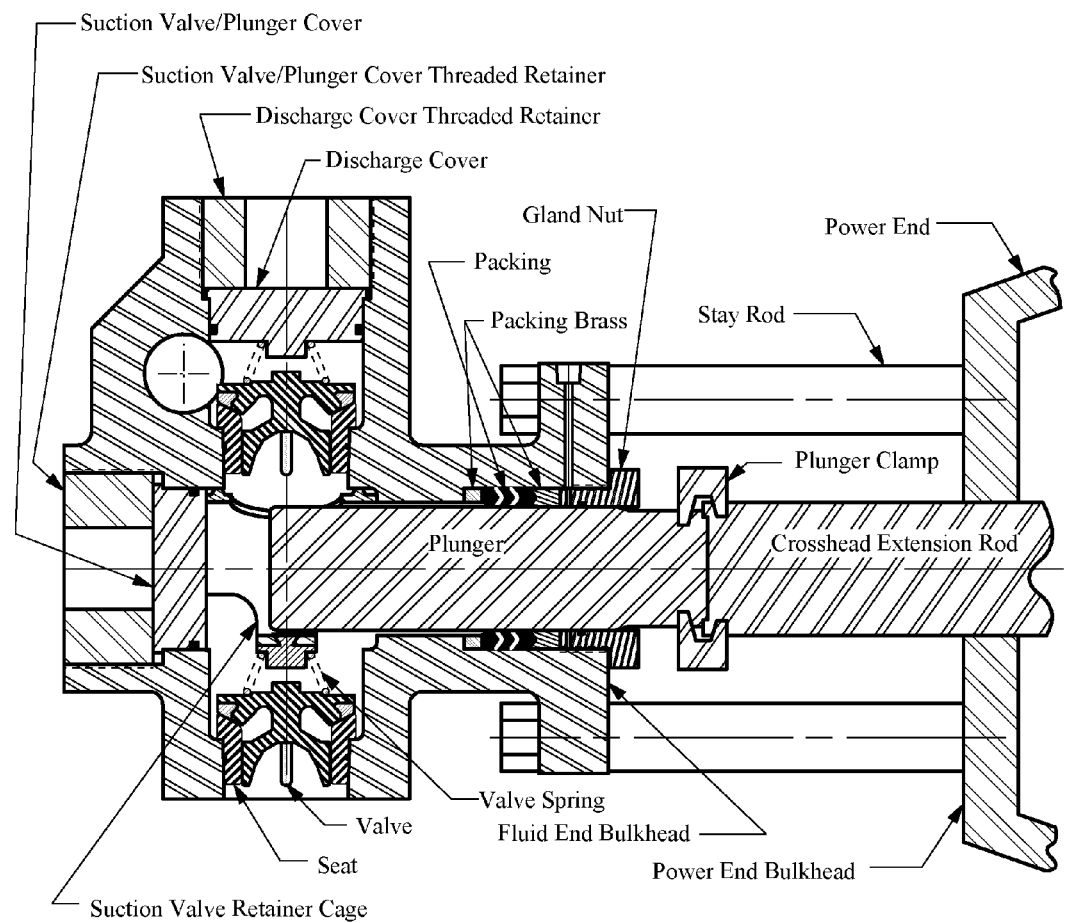
FIG. 1 is a cross-sectional schematic view of a typical plunger pump fluid section showing its connection to a power section by stay rods.
Figure 2C:
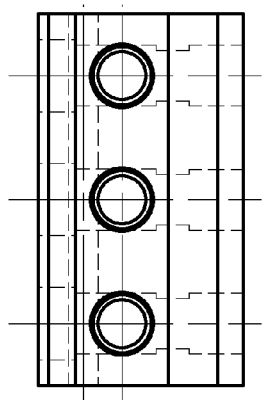
FIG. 2C is the top projected view of the fluid end housing of FIG. 2A.
Figure 2B:
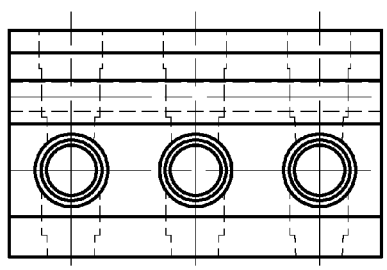
FIG. 2B is the front projected view of the fluid end housing of FIG. 2A.
Figure 2A:
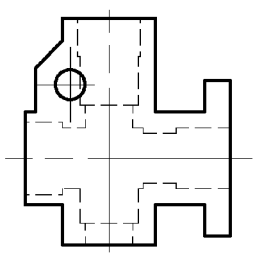
FIG. 2A is an exterior view of the fluid end housing shown in a sectional view in FIG. 1.
Figure 2D:
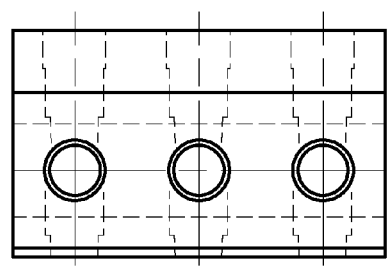
FIG. 2D is the rear projected view of the fluid end housing of FIG. 2A.
Figure 3:
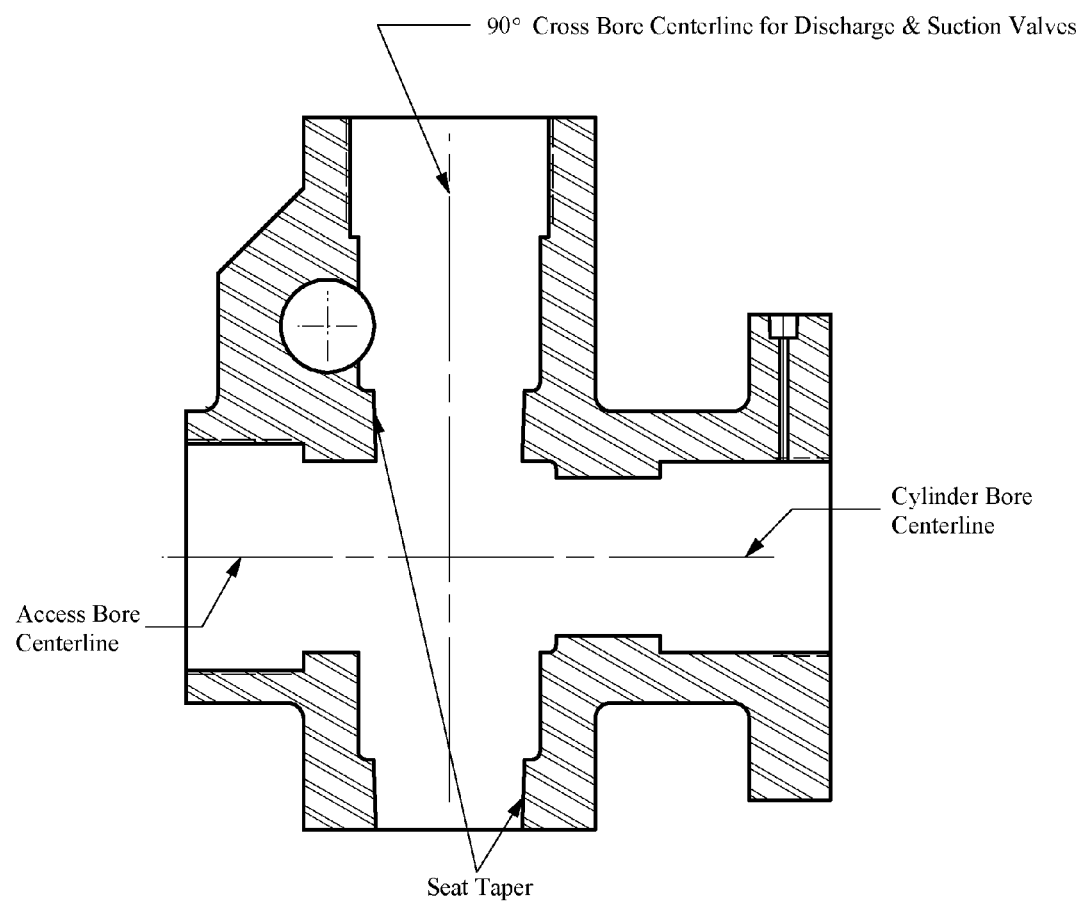
FIG. 3 is a cross-sectional of one of the cylinders of FIG. 2.
Figure 4:
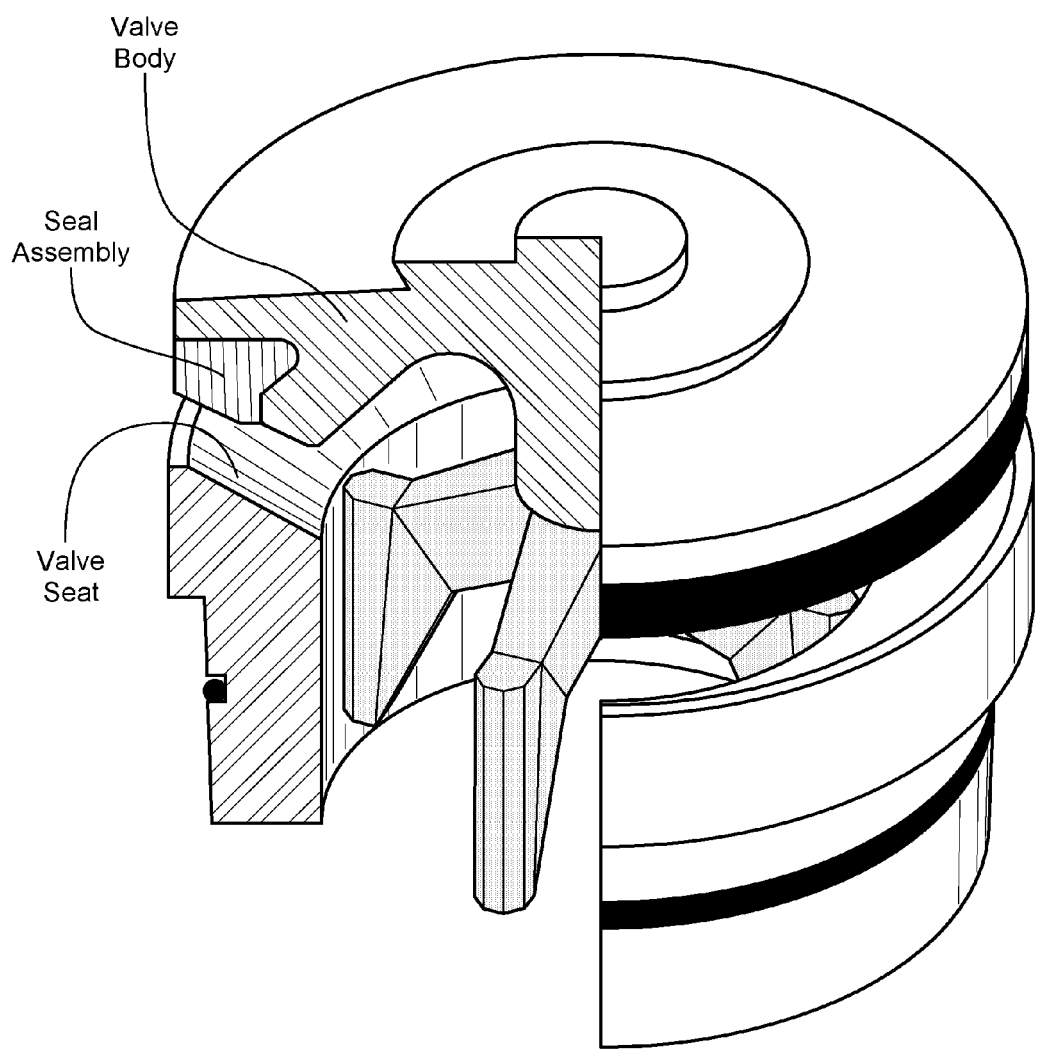
FIG. 4 schematically illustrates a typical valve body and seat assembly for fracturing pumps, the valve being in the open position.
Figure 5:
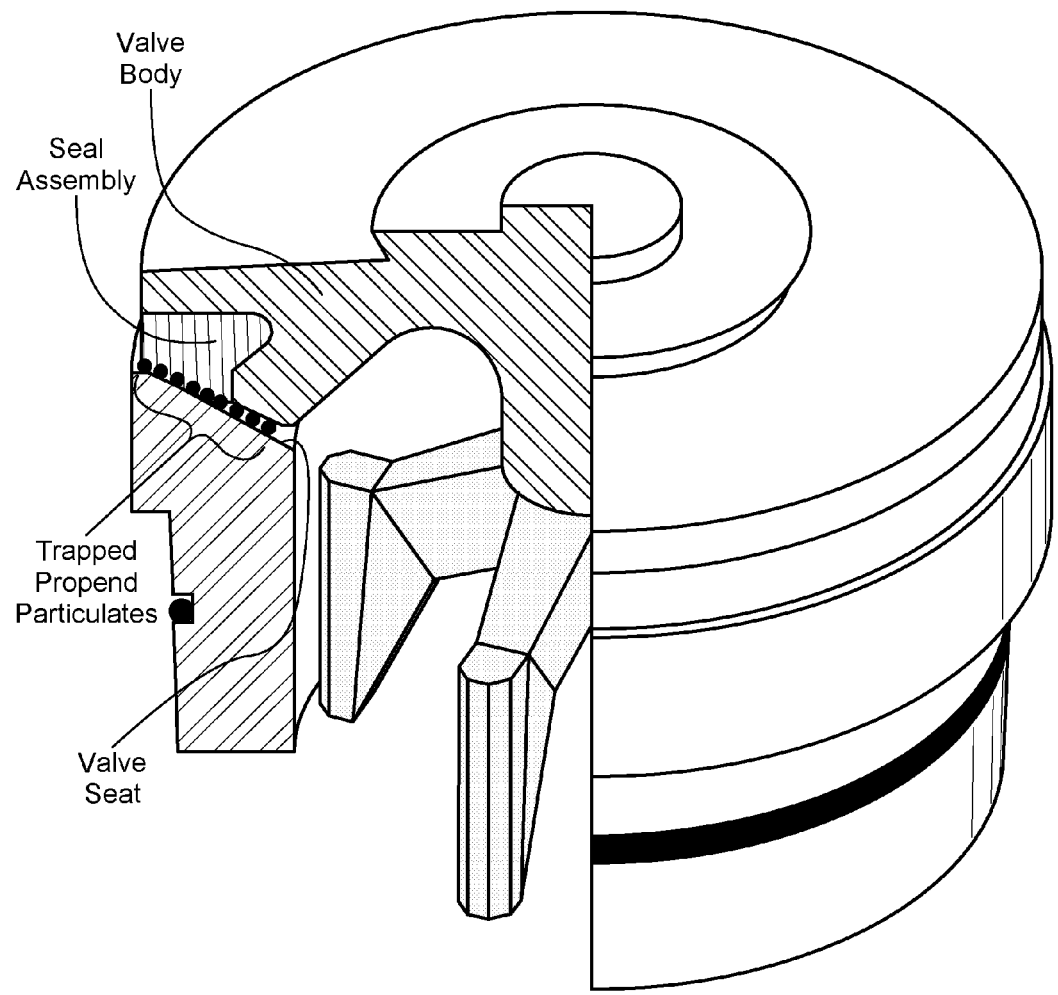
FIG. 5 schematically illustrates sand particles and/or aluminum oxide spheres trapped between mating surfaces during closure of the valve in FIG. 4.
Figure 6:
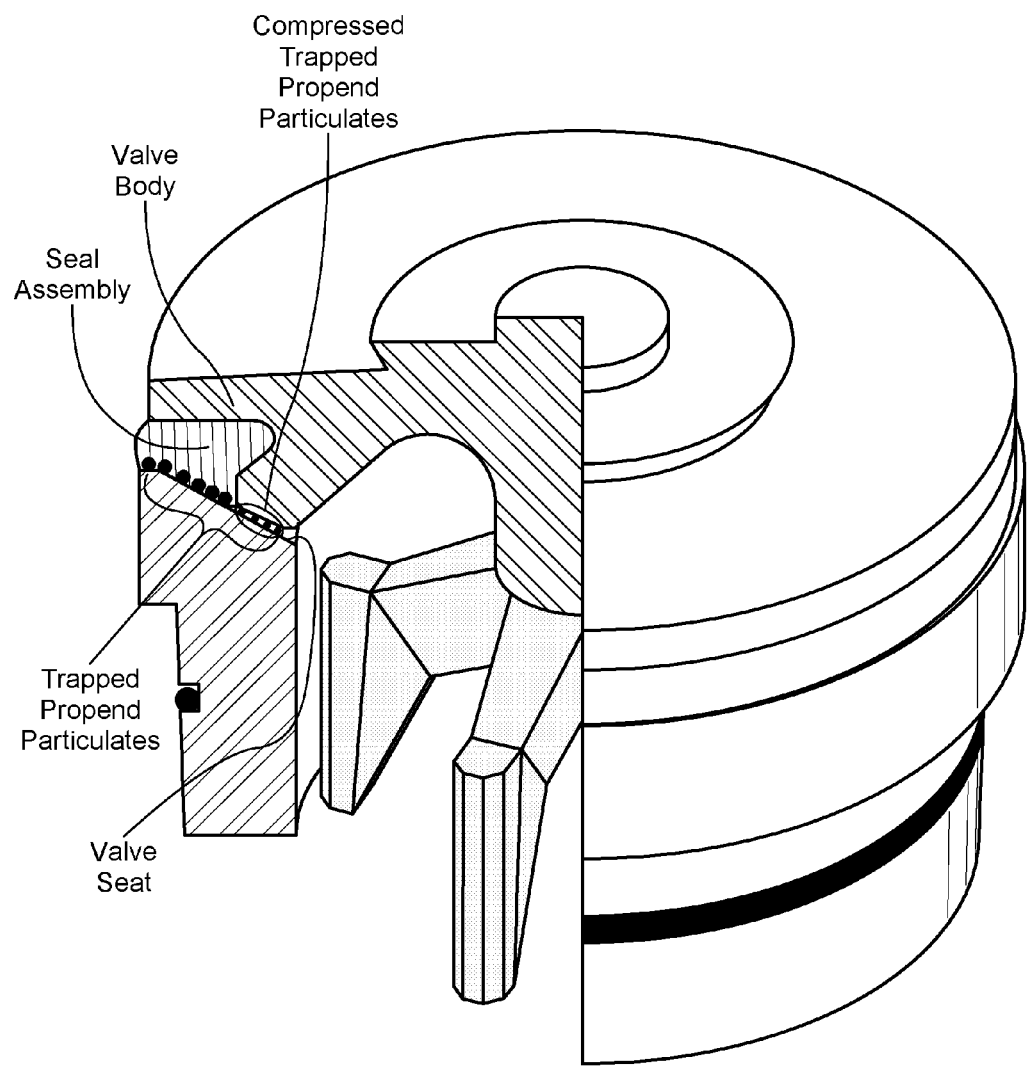
FIG. 6 schematically illustrates how the slurry particles that are not expelled from between the valve mating surfaces of FIGS. 4 and 5 are trapped and crushed upon completion of valve closure.
Figure 7A:
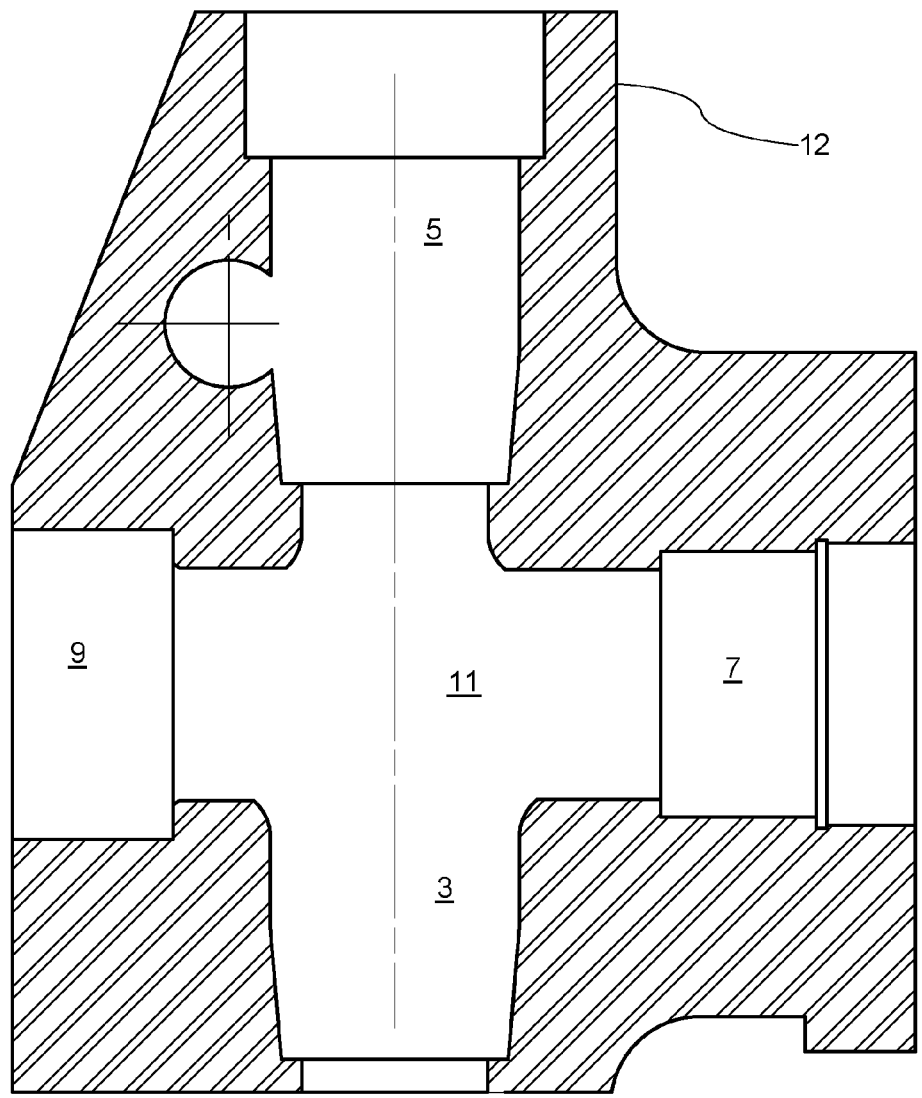
FIG. 7A schematically illustrates a cross-section of a right-angular plunger pump housing and fluid chamber.

FIG. 7A illustrates an embodiment of a cross-section of a fluid end housing 12 of a right-angular plunger pump 10. Said housing comprises an internal fluid chamber 11, a suction bore 3, a discharge bore 5, an access bore 9, and a plunger bore 7.

Figure 7B:
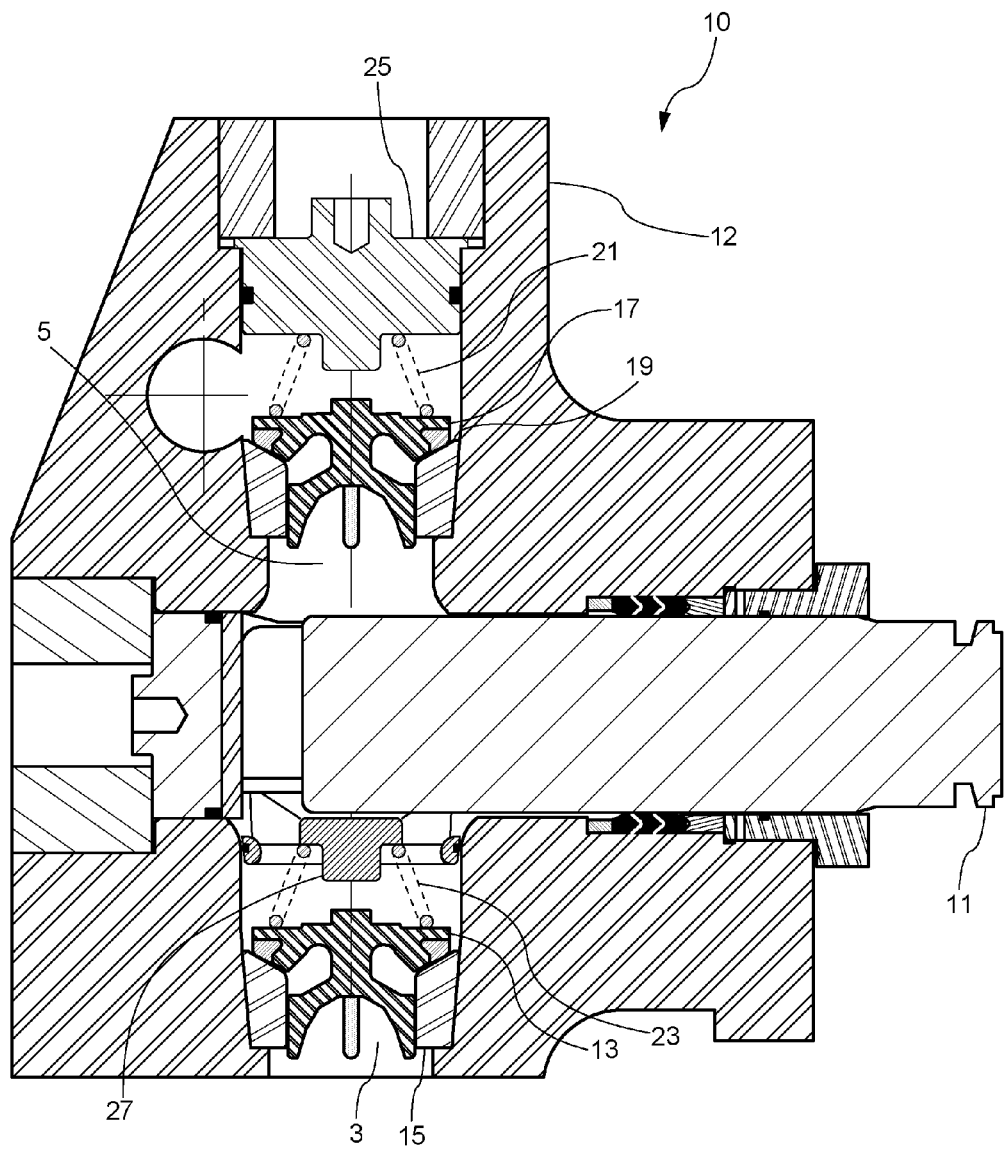
FIG. 7B schematically illustrates a cross-section of a right-angular plunger pump with valves, plunger, valve springs and seats of the present invention.

FIG. 7B illustrates an embodiment of a cross-section of a right-angular plunger pump 10 made using a fluid end housing 12 and an internal fluid chamber 11. Said fluid chamber 11 comprises a suction bore 3, discharge bore 5, access bore 9 suction valve 13, seat 15, discharge valve 17, seat 19, plunger 11 present in a plunger bore 7, suction valve spring 23, suction valve spring retainer 27, discharge valve spring 21, discharge cover and spring retainer 25 according to some embodiments of the disclosure. In the embodiments shown in FIG. 7B, the springs and retainers function to provide a mechanical bias to the suction valve and discharge valve, towards a closed position.

In accordance with embodiments of the disclosure exemplified by FIG. 7B, valve seats 15, 19 are disposed in suction bore 3 and discharge bore 5 respectively, so that the outer wall portions of valve seats 15, 19 are entirely disposed within a tapered portion of suction bore 3 and discharge bore 5. Stated another way, the portions of suction bore 3 and discharge bore 5 at which valve seats 15, 19 are present are tapered, along the entire length of the area of contact between the valve seats 15, 19 and the tapered portions of bores 3, 5.

In some embodiments, the taper of the portions of suction bore 3 and discharge bore 5 in which valve seats 15, 19 are disposed is a continuous taper, i.e., the degree of taper per unit length in either one of the bores, and optionally both bores, is constant at all points at which each valve seat contacts the tapered regions within suction bore 3 and discharge bore 5. Thus, in some embodiments the entire valve seat 15, 19 is disposed in a continuously tapered portion of a bore 3, 5 as shown in FIG. 7B.

Figure 8:
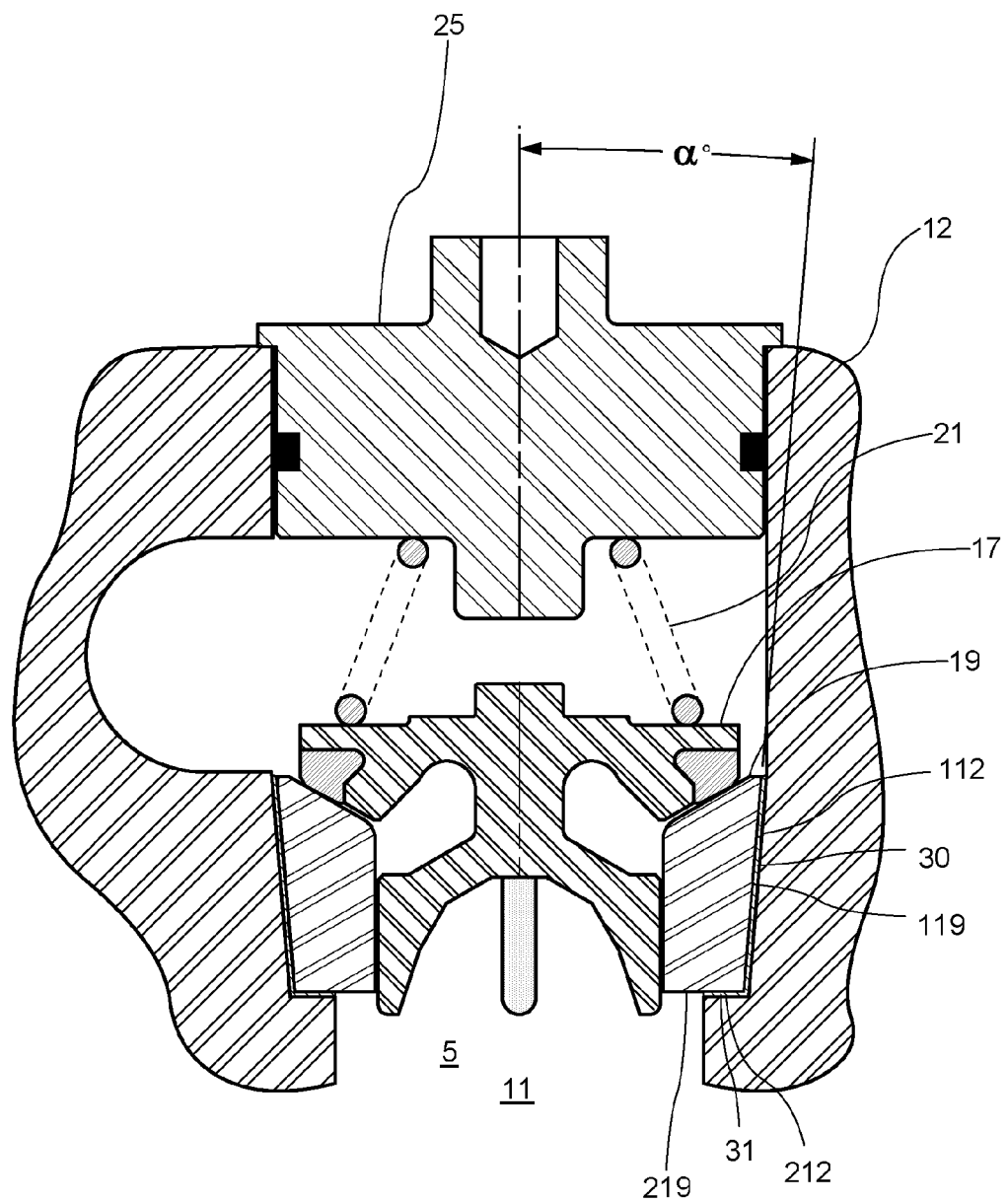
FIG. 8 schematically illustrates an embodiment of a discharge valve seat constructed of tungsten carbide in which the carbide seat is secured by a bonding agent to the mating tapers and shoulders of the seat and fluid end.

FIG. 8 illustrates a cross-section of the discharge chamber of a right-angular plunger pump 10 made using a housing 12 and an internal fluid chamber 11. Said fluid chamber 11 having a discharge bore 5, discharge valve 17, discharge seat 19, discharge valve spring 21, discharge cover and spring retainer 25 according to the disclosure exemplified by FIG. 7B. The tapered mating surface 119 of discharge seat 19 is bonded to mating tapered mating surface 112 of housing 12. Taper angle α may be between zero taper to 2.5 inches taper per foot on the diameter. Tapered mating face 119 of discharge seat 19 is separated from tapered mating face 112 of housing by 0.001-0.010 inches per side; said space being occupied by a bonding agent 30. Bottom surface 219 of discharge seat 19 rests against shoulder surface 212 of housing 12. Bottom surface 219 of discharge seat 19 is separated from shoulder surface 212 of housing 12 by 0.001-0.010 inches per side; said space being occupied by bonding agent 31.

In the various embodiments described herein, the bonding agent serves the dual purpose of securing the valve seats 15, 19, while also serving to absorb compressive forces when the respective valve bodies are pressed against the valve seats by intense fluid pressures. In some embodiments, the bonding agent comprises cured epoxy. In various other embodiments, the bonding agent comprises polyester resin, polyurethane resin, polyols, or acrylic polymers.

Figure 9:
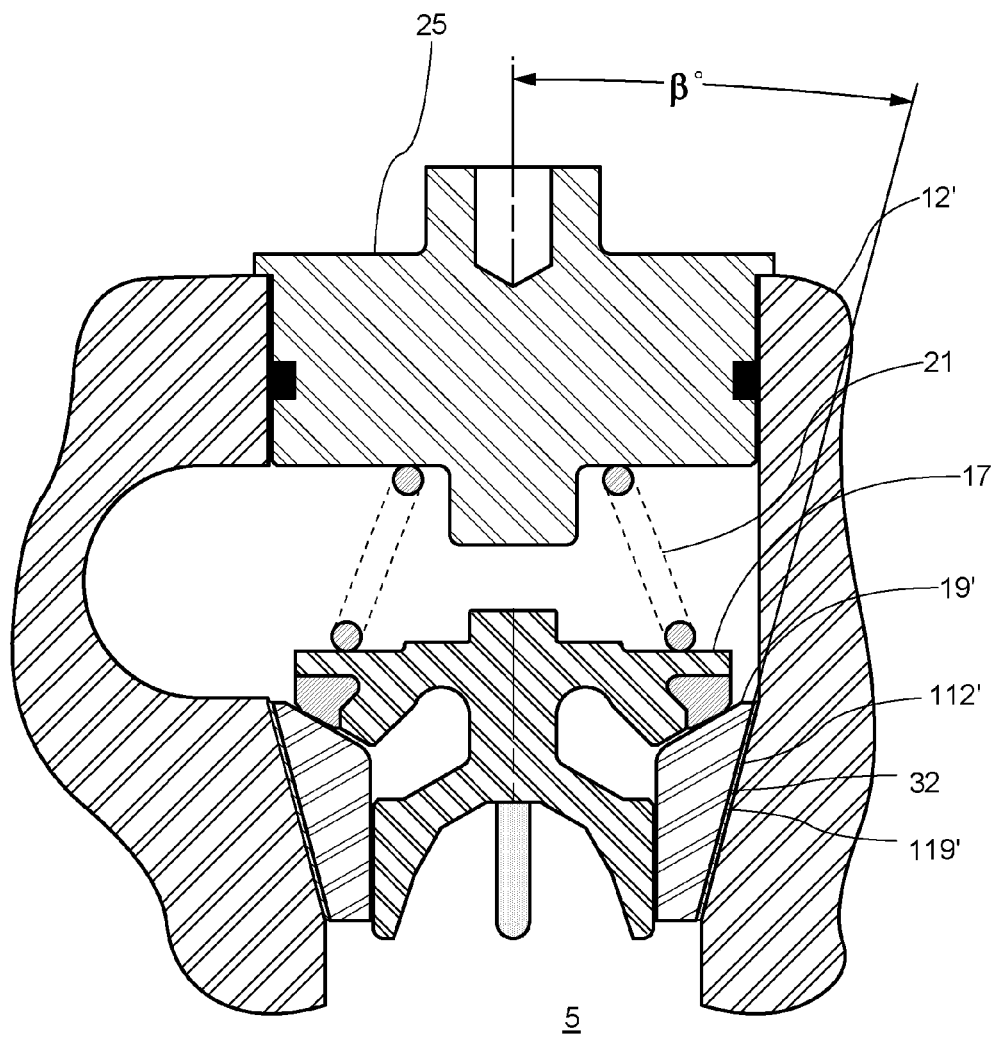
FIG. 9 schematically illustrates an embodiment of a discharge valve seat constructed of tungsten carbide in which the carbide seat is secured by a bonding agent to the mating tapers of the seat and fluid end; shoulder replaced by a fast taper.

FIG. 9 illustrates an alternate embodiment invention with a cross-section of the discharge chamber of a right-angular plunger pump 10 made using a housing 12', and having a discharge bore 5, discharge valve 17, discharge seat 19', discharge valve spring 21, discharge cover and spring retainer 25. Tapered mating surface 119' of discharge seat 19' is bonded to mating tapered surface 112' of housing 12'. Taper angle β is greater than 2.5 inches taper per foot on the diameter. Tapered mating surface 119' of discharge seat 19' is separated from tapered mating surface 112' of housing by 0.001-0.010 inches per side; said space being occupied by cured bonding agent 32.

Figure 10:
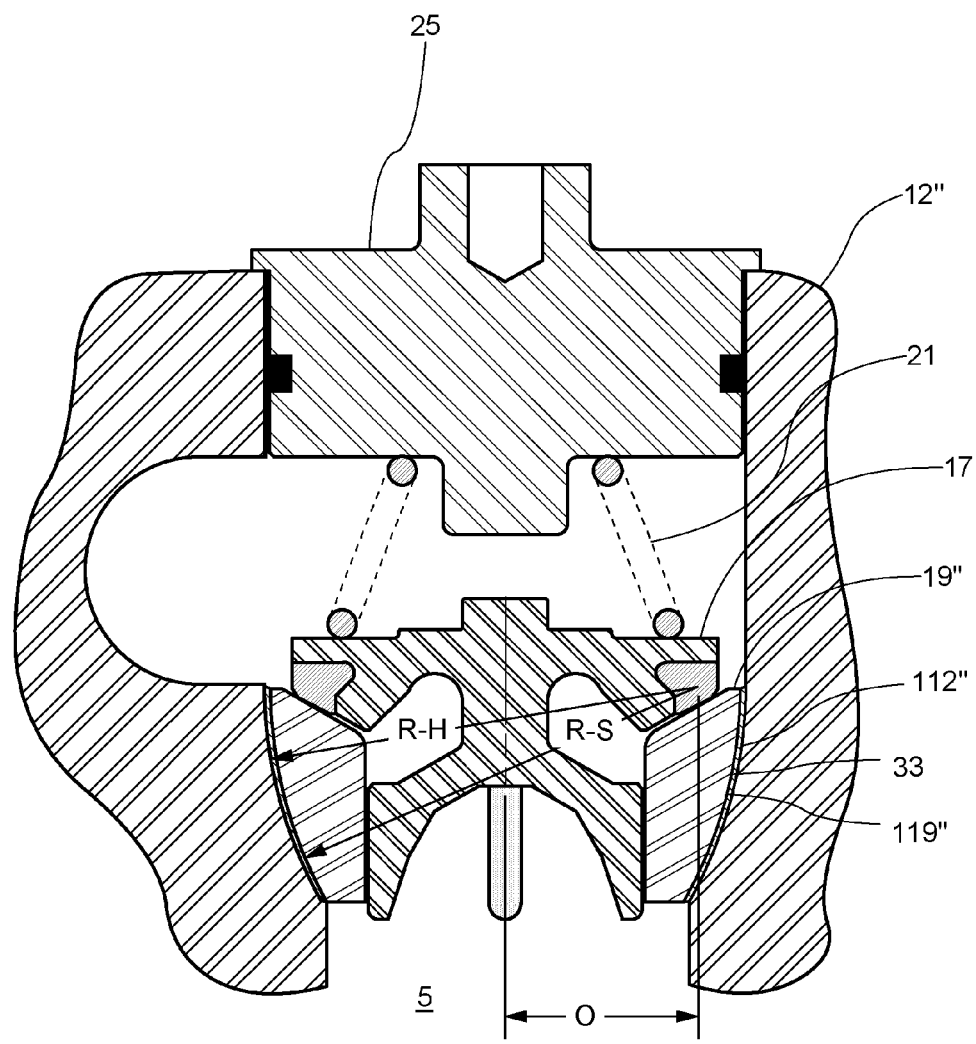
FIG. 10 schematically illustrates an alternate embodiment of a valve seat constructed of tungsten carbide in which the carbide seat is secured by a bonding agent to the mating surface in the fluid end. The mating surface of the seat is concave and the mating surface of the fluid end is convex.

FIG. 10 illustrates an alternate embodiment invention with a cross-section of the discharge chamber of a right-angular plunger pump 10 made using a housing 12", and having a discharge bore 5, discharge valve 17, discharge seat 19", discharge valve spring 21, discharge cover and spring retainer 25. Concave mating surface 119" of discharge seat 19" is bonded to mating convex surface 112" of housing 12". Radius R-S of concave surface 119" and radius R-H convex mating surface 112" are utilized to define concave surfaces 119" and convex mating surface 112" respectfully. Center of radius R-S and R-H are offset from centerline of the seat 19" by offset O. Concave mating surface 119" of seat 19" is separated from convex mating surface 112" of housing 12" by 0.001-0.010 inches per side; said space being occupied by cured bonding agent 33.

The present disclosure is not necessarily limited to the example embodiments embodiment described herein. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A fluid end assembly comprising:
   a fluid end housing;
   a valve body;
   a valve seat, wherein said valve seat is formed with a cemented tungsten carbide;
   wherein:
      said valve body comprises a first mating surface configured to be received in a nested position against a second mating surface on said valve seat in response to compressive fluid pressure;
      said valve seat further comprises a third mating surface that is secured by a bonding agent to a fourth mating surface on said fluid end housing, wherein said third and fourth mating surfaces comprise first and second complementary tapers, respectively, and wherein said bonding agent is evenly distributed between said third and fourth tapered mating surfaces by pressure applied to said valve seat during insertion of said valve seat into said fluid end housing; and
      said bonding agent is operable to absorb a portion of said compressive fluid pressure on said valve body when said valve body is compressed in said nested position by said compressive fluid pressure.

2. The fluid end assembly of claim 1 wherein said epoxy bonding agent comprises layer of epoxy between said third and fourth mating surfaces, said layer having a thickness of between 0.001 and 0.010 inches.

3. The fluid end assembly of claim 2, wherein said layer of epoxy is formed by a method comprising:
- applying a layer of epoxy between said third and fourth mating surfaces, said layer having an initial thickness in excess of 0.010 inches;
- applying pressure to squeeze a portion of said layer of epoxy out of the space between said third and fourth mating surfaces to form a layer of epoxy having a thickness of between 0.001 and 0.010 inches.

4. A fluid end assembly of claim 1 in which the interface angle between said third mating surface of said seat and said fourth mating surface of said housing does not exceed 2.5 inches taper per foot on the diameter.

5. The fluid end assembly of claim 1 in which the interface angle between said third mating surface of said seat and said fourth mating surface of said housing exceeds 2.5 inches taper per foot on the diameter.

6. A fluid end assembly of claim 5, wherein the interface between said fluid end housing and said valve seat further includes and internal shoulder in said fluid housing that shoulders with the bottom of the valve seat.

7. The fluid end assembly of claim 1, wherein said bonding agent comprises cured epoxy bonding agent.

8. The fluid end assembly of claim 7, wherein said epoxy bonding agent comprises a multi-part adhesive.

9. The fluid end assembly of claim 7, wherein said epoxy bonding agent comprises a single-part adhesive.

10. A fluid end assembly of claim 1 wherein the interface between said fluid end housing and said valve seat further includes and internal shoulder in said fluid housing that shoulders with the bottom of the valve seat.

11. The fluid end assembly of claim 10 wherein said valve seat is formed with a tungsten carbide.

12. The fluid end assembly of claim 10, wherein said bonding agent comprises cured epoxy bonding agent.

13. The fluid end assembly of claim 12 wherein said epoxy bonding agent comprises layer of epoxy between said third and fourth mating surfaces, said layer having a thickness of between 0.001 and 0.010 inches.

14. The fluid end assembly of claim 12, wherein said layer of epoxy is formed by a method comprising:
- applying a layer of epoxy between said third and fourth mating surfaces, said layer having an initial thickness in excess of 0.010 inches;
- applying pressure to squeeze a portion of said layer of epoxy out of the space between said third and fourth mating surfaces to form a layer of epoxy having a thickness of between 0.001 and 0.010 inches.

15. A fluid end assembly comprising:
- a fluid end housing;
- a valve body;
- a valve seat, wherein said valve seat is formed with a cemented tungsten carbide;

wherein:
- said valve body comprises a first mating surface configured to be received in a nested position against a second mating surface on said valve seat in response to compressive fluid pressure;
- said valve seat further comprises a third convex mating surface that is secured by a bonding agent to a fourth concave mating surface on said fluid end housing, wherein said third convex mating surface and fourth concave mating surfaces comprise first and second complementary tapers, respectively, and wherein said bonding agent is evenly distributed between said third convex mating surface and said fourth concave mating surface by pressure applied to said valve seat during insertion of said valve seat into said fluid end housing; and
- said bonding agent is operable to absorb a portion of said compressive fluid pressure on said valve body when said valve body is compressed in said nested position by said compressive fluid pressure.

* * * * *